United States Patent [19]

Thompson

[11] Patent Number: 4,987,360
[45] Date of Patent: Jan. 22, 1991

[54] SELF-CONTAINED RECHARGEABLE BATTERY POWER SOURCE WITH VOLTAGE REDUCER

[75] Inventor: William J. Thompson, Kittery, Me.
[73] Assignee: Bill's Ice Cream, Inc., Kittery, Me.
[21] Appl. No.: 290,759
[22] Filed: Dec. 27, 1988
[51] Int. Cl.⁵ .................................................. H02J 7/00
[52] U.S. Cl. .......................................... 320/6; 320/14; 320/18; 307/150
[58] Field of Search ........................................ 320/2–7, 320/15–18, 20, 14; 307/150

[56] References Cited

U.S. PATENT DOCUMENTS

| | | | |
|---|---|---|---|
| 992,628 | 5/1911 | Aichele | 320/18 X |
| 2,649,493 | 8/1953 | Temple | 320/7 UX |
| 2,937,706 | 5/1960 | Chandler | 320/18 X |
| 3,967,133 | 6/1976 | Bokern | 320/2 X |
| 4,081,738 | 3/1978 | Roller | 320/7 |
| 4,315,162 | 2/1982 | Ferguson | 320/16 X |

FOREIGN PATENT DOCUMENTS 2120473A 11/1983 United Kingdom ................. 320/20

*Primary Examiner*—R. J. Hickey
*Attorney, Agent, or Firm*—Hale & Dorr

[57] ABSTRACT

A portable, self-contained, rechargeable battery power source provides a plurality of voltage levels to a load circuit, thus allowing one source to replace the need for many batteries. The battery is a high-capacity unit of the type used in camcorders and enables increased playing time for each battery period of charge.

1 Claim, 1 Drawing Sheet

SELF-CONTAINED RECHARGEABLE BATTERY POWER SOURCE WITH VOLTAGE REDUCER

BACKGROUND OF INVENTION

The invention relates generally to power sources, and in particular, to a portable, rechargeable battery power source which provides a high capacity and plurality of voltages at its output.

Batteries are available in a number of different configurations. The batteries, however, are typically designed to replace a standard nickel/zinc or alkaline battery and are available at standard voltages and sizes. Accordingly, it is necessary to buy a large number of different batteries to operate different components which require, for example, one and one-half volts, three volts, and nine volts for correct operation. In addition, most commercially available rechargeable batteries for special components are of an undesirably small limited capacity and, as is the nature of a rechargeable battery, do not provide substantial advance warning prior to discharge, when their voltage diminishes substantially. Further, because the standard available rechargeable battery does not have substantial capacity, its use is limited and the battery must be recharged on a regular, periodic basis.

Accordingly, objects of the present invention are a battery system capable of being electrically connected to various components by providing a plurality of voltages and a battery system having a large capacity so that recharging is not necessary on a frequent basis.

SUMMARY OF THE INVENTION

The invention relates to a self-contained portable, rechargeable battery power source. The power source features a high capacity, high voltage rechargeable battery, a switching system for selecting one of a plurality of voltages from the battery, circuitry for connecting the load circuitry to the switching system, and wherein the switching system has further circuitry for connecting the battery to a charging circuit.

In particular aspects of the invention, the plurality circuitry is a resistive potentiometer which provides a completely variable voltage level to the load. In an alternate embodiment of the invention, the plurality circuit is a multi-position switch for providing many "pick off" voltages from the rechargeable battery for use by the load.

DESCRIPTION OF THE DRAWINGS

Other objects, features, and advantages of the invention will be apparent from the following description taken together with the drawings in which.

DESCRIPTION OF PARTICULAR EMBODIMENTS OF THE INVENTION

Figure 1:
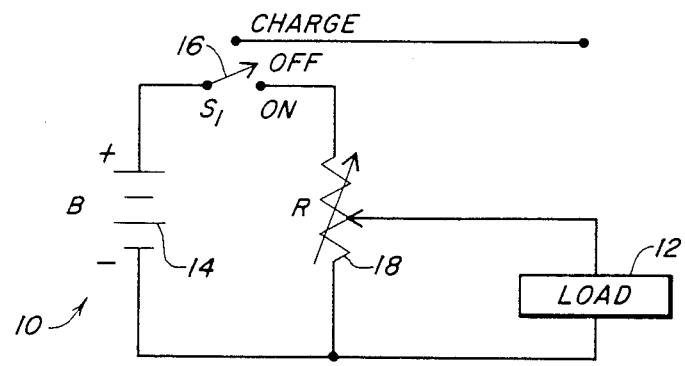
FIG. 1 is a circuit diagram of one implementation of the invention in a completely variable voltage is available from a battery source.

Referring to FIG. 1, a circuit 10 for providing a variable output voltage to a load 12 uses a high voltage battery, for example, battery 14, manufactured by Makita, connected in a series arrangement with a single pole, double throw switch 16 and a center tap potentiometer 18. When the switch, which has a center "off" position, is thrown to the "on" position, the battery is connected through the potentiometer 18 to provide a voltage selection to the load 12. It is preferred that the wiper or slide of the potentiometer 18 is calibrated to provide a substantially constant voltage to the load 12 corresponding to a selected position of the slide or wiper. In this respect, the resistance of the potentiometer is substantially lower than the resistance of the load so that the load does not adversely reduce the voltage provided by the potentiometer.

When the switch 16 is thrown to the charge position, the battery can be inserted into or otherwise connected to a standard charging network for recharging the battery 14. The particular battery 14 selected for this embodiment of the invention is a high-capacity battery such as that used in camcorders and the like. This battery unit, when its output voltage is reduced as described in FIG. 1, provides a substantially long life for such battery operated consumer equipment as radios, lights, stereo "boom boxes," and other consumer products, etc.

Figure 2:
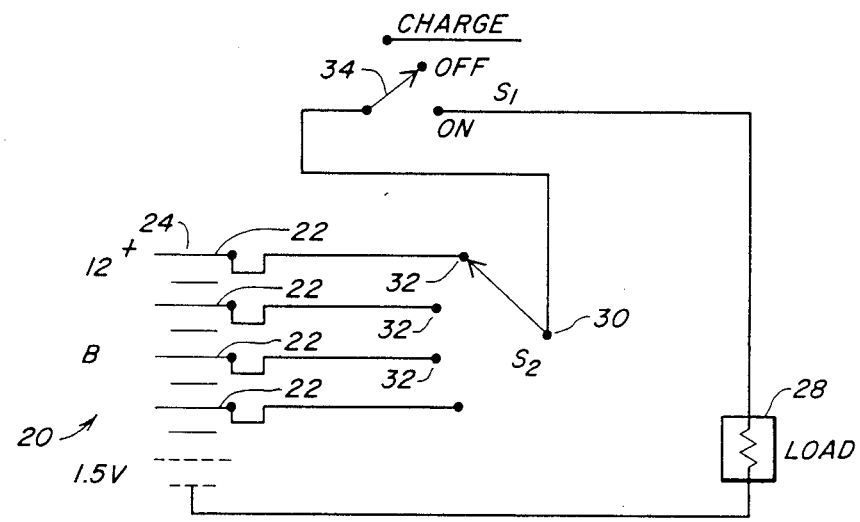
FIG. 2 is a circuit diagram of a switchable battery providing many voltages according to the invention.

Referring now to FIG. 2, in an alternate embodiment of the invention, a battery unit 20 has a voltage selection system which includes a plurality of pick off positions 22 available from a series connection of smaller battery elements of the rechargeable battery unit 24. The rechargeable battery 24, made of a series of cells of a type manufactured by Makita, provides fixed voltages which can be switchably connected to a load 28. The voltage selection system this includes a switch 30, which switches between the various pick off points as illustrated by contacts 32.

A second switch 34, which can be integral to switch 30 in a particular embodiment, provides the same functions as did switch 16 of the illustrated embodiment in FIG. 1. Thus, switch 34 provides for an "on," an "off," and a "charge" position.

In other embodiments of the invention, using semiconductor integrated circuit technology, various zener diode configurations could be employed for providing a plurality of fixed voltages from a battery without requiring the battery to have either a number of pick off points or resistance losses. In addition, the number of available fixed voltages could be increased using a semiconductor integrated circuit technology by selecting, for example, the voltage between two or more zener diode elements.

Additions, subtractions, deletions and other modifications of the particular embodiments illustrated herein will be apparent to those skilled in the art and are within the scope of the following claims.

What is claimed is:

1. A self-contained portable, rechargeable, battery unit power source for powering consumer products, comprising:
   a high-capacity, rechargeable battery unit,
   a voltage selection system for selecting one of a plurality of voltages from said battery,
   a load circuitry,
   means for connecting said load circuitry to said selection system,
   said voltage selection system having means for connecting the battery to a charge circuitry, including
   a multi-position switch for providing a plurality of "pick off" voltages from the rechargeable battery for use by the load, and
   a switch in series with the multi-position switch for connecting, in a first operating mode, the selected voltage to the load, for connecting, in a second operating mode, the rechargeable battery to a charging circuitry, and for disconnecting, in a third operating mode, the battery from both the charging circuitry and the load to prevent unnecessary loss of battery capacity.

* * * * *